US005894112A

United States Patent [19]
Kroll

[11] Patent Number: 5,894,112
[45] Date of Patent: Apr. 13, 1999

[54] WEIGHING SCALE APPARATUS

[75] Inventor: William P. Kroll, Medina, Minn.

[73] Assignee: Intercomp Company, Minneapolis, Minn.

[21] Appl. No.: 08/883,394

[22] Filed: Jun. 26, 1997

[51] Int. Cl.[6] .................. G01G 19/02; G01G 23/14; G01G 21/28
[52] U.S. Cl. .................. 177/134; 177/164; 177/239
[58] Field of Search .................. 177/164, 238, 177/239, 211, 229, 134, 135

[56] References Cited

U.S. PATENT DOCUMENTS

| 2,430,702 | 11/1947 | Bohannan | 177/134 |
|---|---|---|---|
| 4,411,327 | 10/1983 | Lockery et al. | 177/211 |
| 4,483,404 | 11/1984 | Weihs | 177/255 |
| 4,714,121 | 12/1987 | Kroll et al. | 177/134 |
| 4,744,254 | 5/1988 | Barten | 177/211 |
| 4,775,019 | 10/1988 | Scheuter et al. | 177/208 |
| 4,979,581 | 12/1990 | Kroll | 177/211 |
| 5,646,376 | 7/1997 | Kroll et al. | 177/211 |

Primary Examiner—Randy W. Gibson
Attorney, Agent, or Firm—Skinner and Associates

[57] ABSTRACT

A low profile weighing scale for weighing and balancing aircraft and land vehicles. The electronic, strong, lightweight, economical and portable scale provides accurate and reliable results. The scale comprises: (a) a quadrilateral base having two sides and two ends, the base further having recessed load cell mounts, each load cell mount having a strain cavity disposed between two support positions, each support position having a threaded mounting screw aperture for reception of a mounting screw; (b) double ended shear beam load cells, each end of each load cell being mounted to a support position by a mounting screw; (c) a platform having a non-skid top surface for contact with a load and a bottom surface, the bottom surface having load cell recesses sized and aligned with the load cells, each load cell recess having an engagement surface; and (d) engagement members, each comprised of a load bearing, for moveably mating the platform to the load cells and effectively transferring a load force from the platform to the load cells, each load cell having a cupped surface for receiving a load bearing, load ball bearing being in simultaneous operational contact with a concave engagement surface on the platform. The design of the scale effectively and accurately distributes a load force applied to the platform through the engagement members to the load cells.

20 Claims, 7 Drawing Sheets

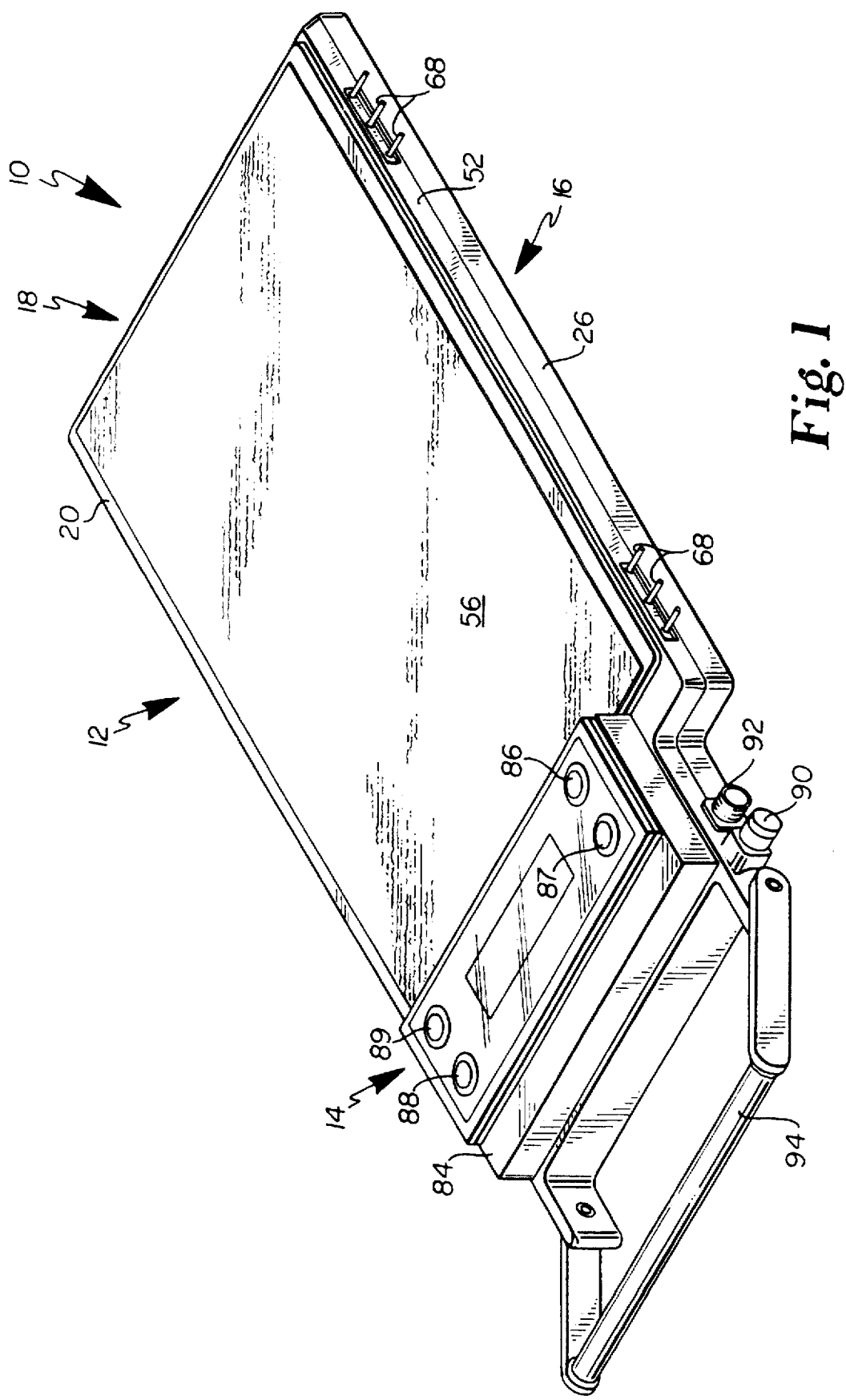

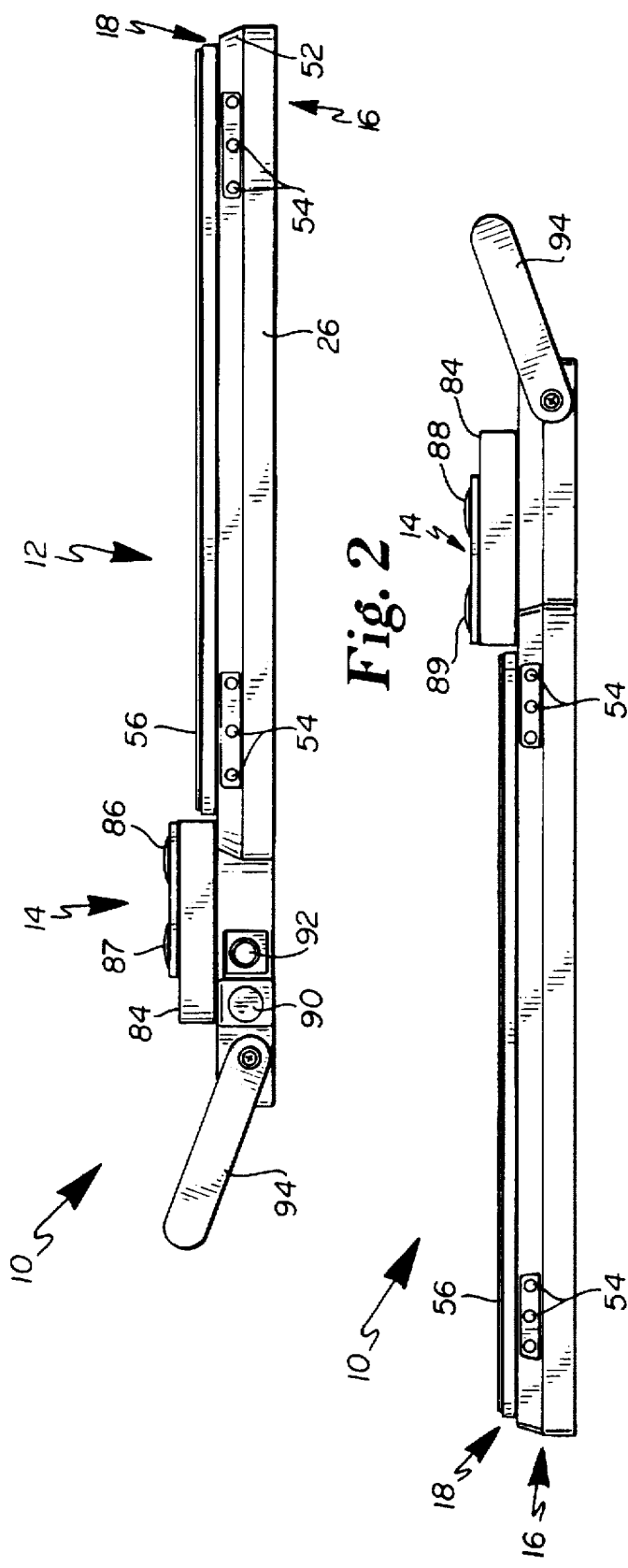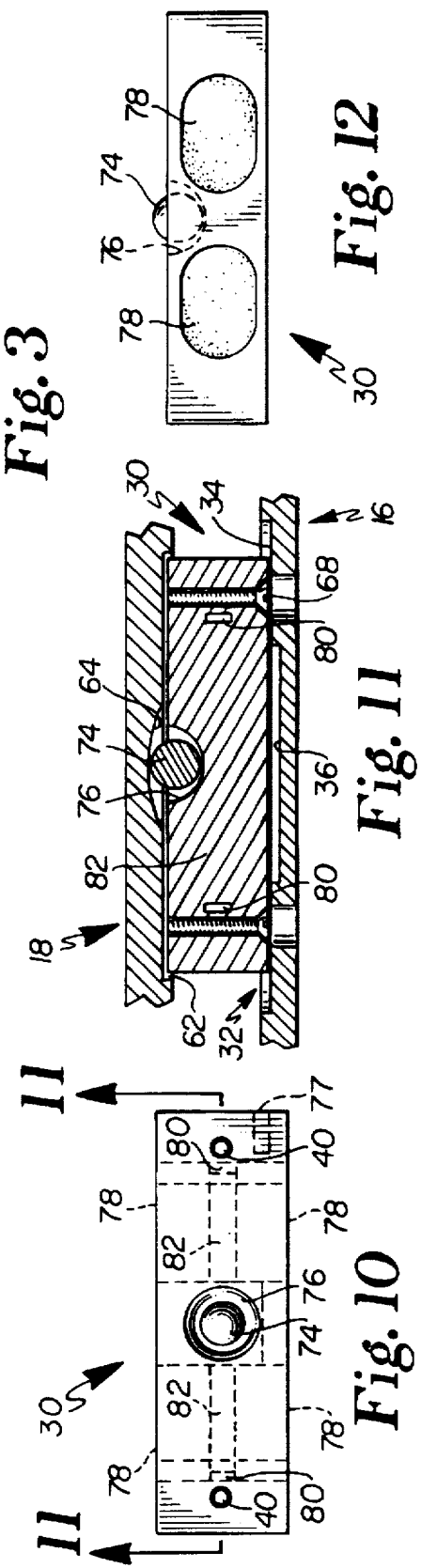

WEIGHING SCALE APPARATUS

BACKGROUND OF THE INVENTION

1. Field of the Invention

This invention relates generally to weighing apparatus and particularly to portable, low profile weighing scales. The weighing scale provided by this invention is useful for weighing and balancing aircraft and land vehicles efficiently, reliably and accurately.

2. Background Information

Applicants Kroll et al. disclosed scales in U.S. Pat. Nos. 4,714,121, 4,979,581, 5,232,064, and 5,646,376, and load cells in U.S. Pat. Nos. 4,775,018, 4,813,504, and 5,228,527. The scales and load cells handle a broad range of weights and have varying degrees of accuracy. Additionally, the scales have varied designs in terms of height, weight, portability and method of use. A common design factor shared by all of these scales and load cells is that in each, the mounting of the load cell in and to the scale is unique and provides a significant advantage over the prior art.

Wheel scales or platform scales are commonly used to measure axle weight loads of vehicles and aircraft. While some scale devices are designed to accommodate the multiple wheels of dual tandem rear axle assemblies of commercial trucks, most wheel scale devices have a single platform to measure the load from single or dual wheels. The weighing scale assemblies and load cell structures of the present invention are particularly useful for weighing and balancing a variety of sizes and types of private, commercial and military aircraft, and for weighing a variety of sizes and types of land vehicles. These scales can be used either alone or in combination with other scales. To weigh a land vehicle for example, a pair of wheel scales is spaced apart and the vehicle is driven onto the scale platforms one axle at a time for all axles. Each axle weight load is recorded and the summation of axle weights yields the gross weight of the vehicle.

Wheel scales utilizing load cells for weighing axle loads of motor vehicles are known in the weighing art. Additionally, wheel scales which utilize strain gauge sensors fixed to deflectable load cells are known. However, the specific configuration of the load cells utilized in prior art scales, the placement of the load cells in these scales, and the cooperation of the active and inactive elements of these prior art wheel scale devices often yield complex and bulky wheel scales which are inaccurate and unrepeatable under many conditions of use.

Prior art wheel scale devices have been proposed and manufactured to use various types of load cell configurations for the purpose of yielding a lightweight, low profile and accurate portable wheel scale. Additionally, various wheel scale structures have been proposed and manufactured wherein these load cell configurations have been utilized with varying cooperative elements. However, these prior art wheel scale structures have often been difficult to use and transport, have been susceptible to damage, and have required the precise placement of loads to achieve reasonable scale accuracy and repeatability.

It is an object of this invention to provide a weighing scale that may be used to weigh and balance aircraft, as well as other vehicles. A further object of this invention is to provide electronic, strong, lightweight, low profile scales which are economical, easily manufactured and which yields reliable and repeatable weighing results with a high degree of accuracy. It is a particular object of this invention to provide a scale that has an improved platform member, an improved structure for mounting one or more load cells to a base member, and an improved engagement structure for effectively transferring a load force from the platform member to the load cells.

SUMMARY OF THE INVENTION

The present invention provides an electronic, low profile, and portable weighing scale, comprising: a base of a predetermined height having load cell mounts; a number of shear beam load cells mounted to the base via the load cell mounts; a platform for supporting the object to be weighed; and a number of engagement members equal to the number of load cells for effectively transferring a load force from the platform member to the load cells.

In a preferred embodiment, the aircraft weighing scale comprises (a) a quadrilateral base having two sides and two ends, the base further having six recessed load cell mounts, each load cell mount having a strain cavity disposed between two support positions, each support position having a threaded mounting screw aperture for reception of a load cell mounting screw; (b) six double ended shear beam load cells, each end of the load cell being mounted to a support position in a load cell mount; (c) a platform having a non-skid top surface for contact with a load and a bottom surface, the bottom surface having a load cell recesses sized and aligned with the load cells, each load cell recess having an engagement surface; and (d) engagement members, each comprised of a load bearing, for moveably mating the platform to the load cells and effectively transferring a load force from the platform to the load cells, each load cell having a cupped surface for receiving the load bearing, the load bearing being in simultaneous operational contact with the engagement surface on the platform.

A scale of the present invention may be used with other scales to form an interconnected assembly of individual wheel scales or pads which are communicatively linked by cables to a control unit. This arrangement is particularly useful for weighing and balancing aircraft and land vehicles.

The benefits of this invention will become clear from the following description by reference to the drawings.

BRIEF DESCRIPTION OF THE DRAWINGS

FIG. 1 is a perspective view of a weighing scale of the present invention.

FIG. 2 is a side view of the scale.

FIG. 3 is an opposite side view of the scale.

FIG. 10 is a top view of a load cell used in the scale of FIG. 1.

FIG. 11 is a cross-sectional view taken along line 11—11 of the load cell of FIG. 10, including portions of the base and platform for clarity.

FIG. 12 is a side view of the load cell.

DESCRIPTION OF THE PREFERRED EMBODIMENTS

Figure 4:
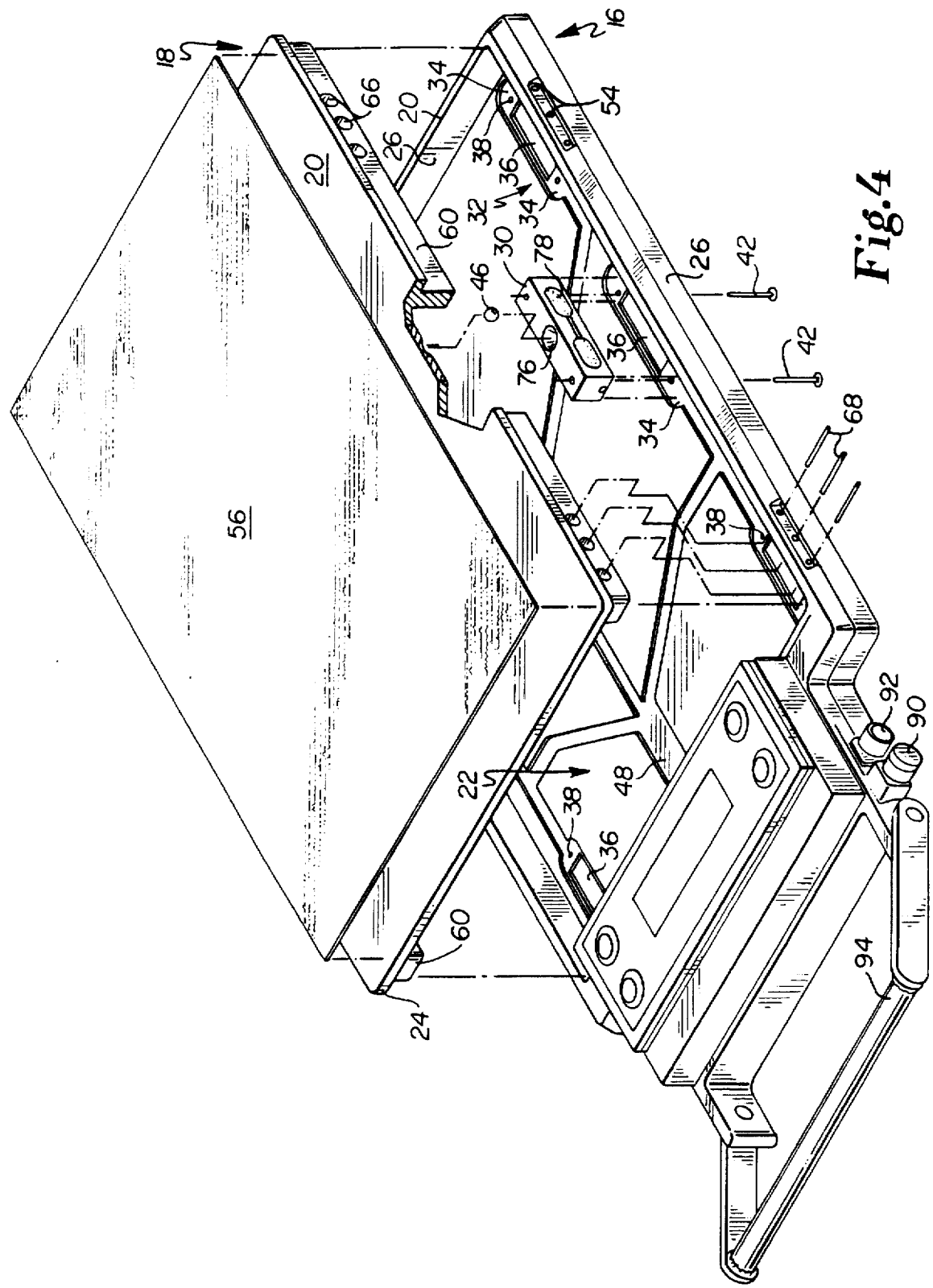
FIG. 4 is an exploded perspective view of the scale, partially cut away for clarity.

Referring to FIGS. 1–4, an example of the preferred embodiment of the present invention is illustrated and generally indicated by the reference numeral 10. The scale 10 is described below first in terms of its major structural elements and then in terms of its secondary structural and/or functional elements. The weighing scale 10 according to the present invention provides a self-contained apparatus for weighing loads of between 10,000–100,000 lb. (5,000–45,350 kg.) with an accuracy of up to plus or minus 0.1 percent. The scales 10 are fully portable and have a total weight each of approximately 70 pounds (32 kg.), with exterior dimensions of approximately 27 inches (69 cm.) in length and 15 inches (38 cm.) in width, and 1.5 inches (3.8 cm.) in height.

One or more scales 10 are typically placed under each wheel or wheel set to enable the system to measure the total weight of an aircraft or vehicle. The weight sensed at each scale 10 may also be determined. Between three and eighteen (3–18) scales 10 may be communicatively connected to a central control unit (not shown) as desired for certain weighing procedures. A preferred central control unit is the AC100™ Central Proccessing Unit manufactured and sold by applicants' assignee, Intercomp Company of Minneapolis, Minn. Each scale 10 is a self-contained unit which is also capable of operation alone. Although in the instant example, the structure and function of the scale 10 is discussed in the context of weighing aircraft or land vehicles, the teachings of this invention may be used to produce scales for use in other fields.

Referring to FIG. 1, the scale 10 of the present invention comprises a weigh pad portion 12 and an electronic control/display portion or display 14 which are joined in a unitary structure. The pad portion 12 of scale 10 further comprises a base 16 and a platform 18. The generally square platform 18 has a top surface 20 which has an area sufficient to support the object to be weighed by the scale 10, and further to provide a stable, sturdy and relatively low profile scale 10. The base 16 has horizontal dimensions which are slightly larger than those of the platform 18. The aircraft tire or load is preferably centered along the middle of the platform 18 so as to be equidistantly spaced from the edges of the scale 10, although the scale 10 is designed to be accurate if the load is not exactly centered.

The base 16 and platform 18 of the scale 10 are preferably constructed of high strength cast aluminum or a similar sturdy, durable, and lightweight material. The base 16 preferably has a grooved, nonskid surface on its bottom 44 to prevent slipping and skidding of the scale during use. The scale 10 has a very low profile or height of approximately 1.5 inches or less. This low profile provides easy wheel access to the platform 12 without the need for large ramp structures. However, the scale 10 can accommodate the use of ramps because there may be circumstances in which ramps remain desirable or even necessary. This low profile also provides increased accuracy for weighing multiple axle vehicles one axle at a time by preventing load shifting to other axles when the axle being weighed is raised.

Figure 5:
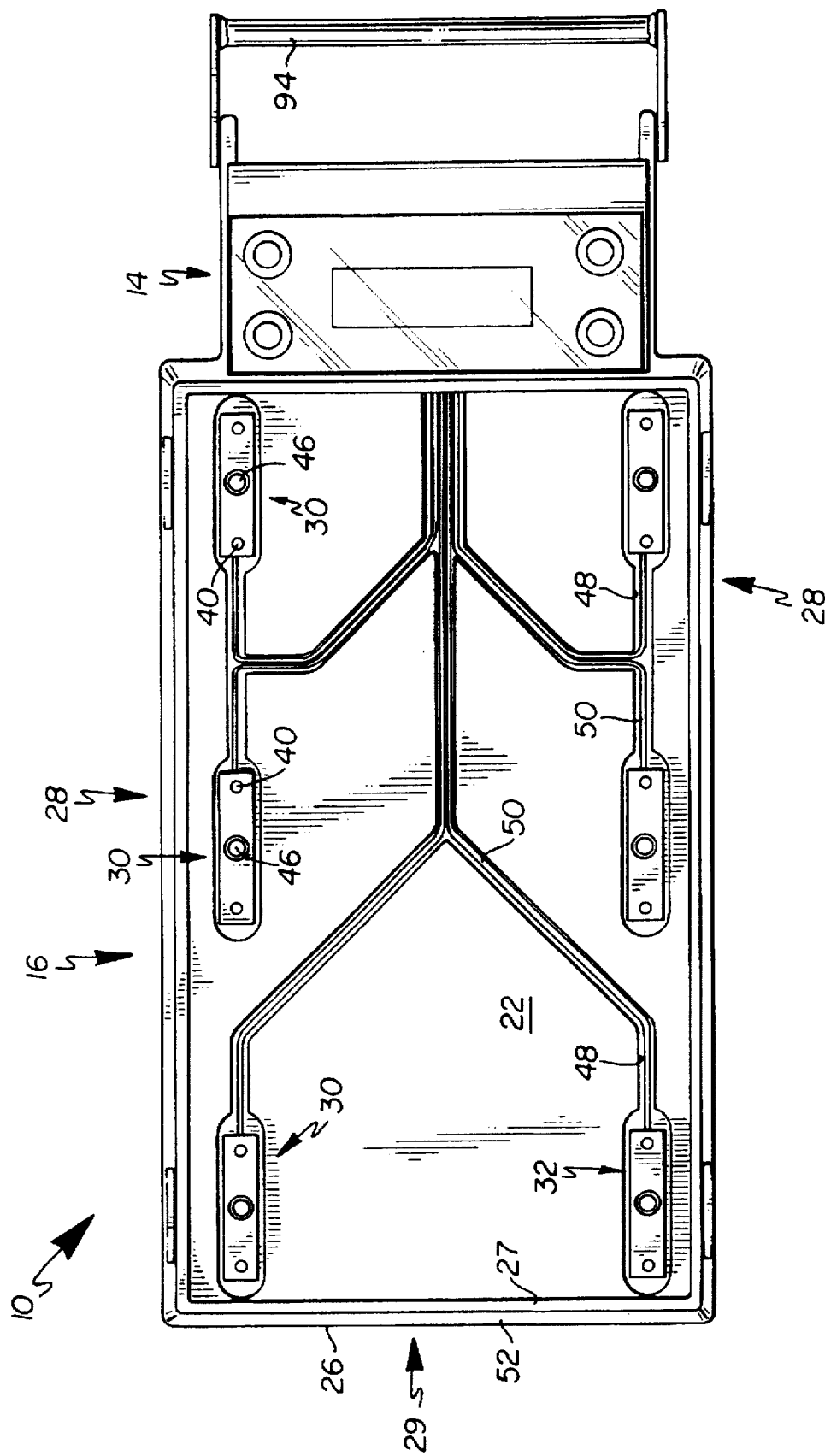
FIG. 5 is a top view of the base of the scale.
Figure 6:
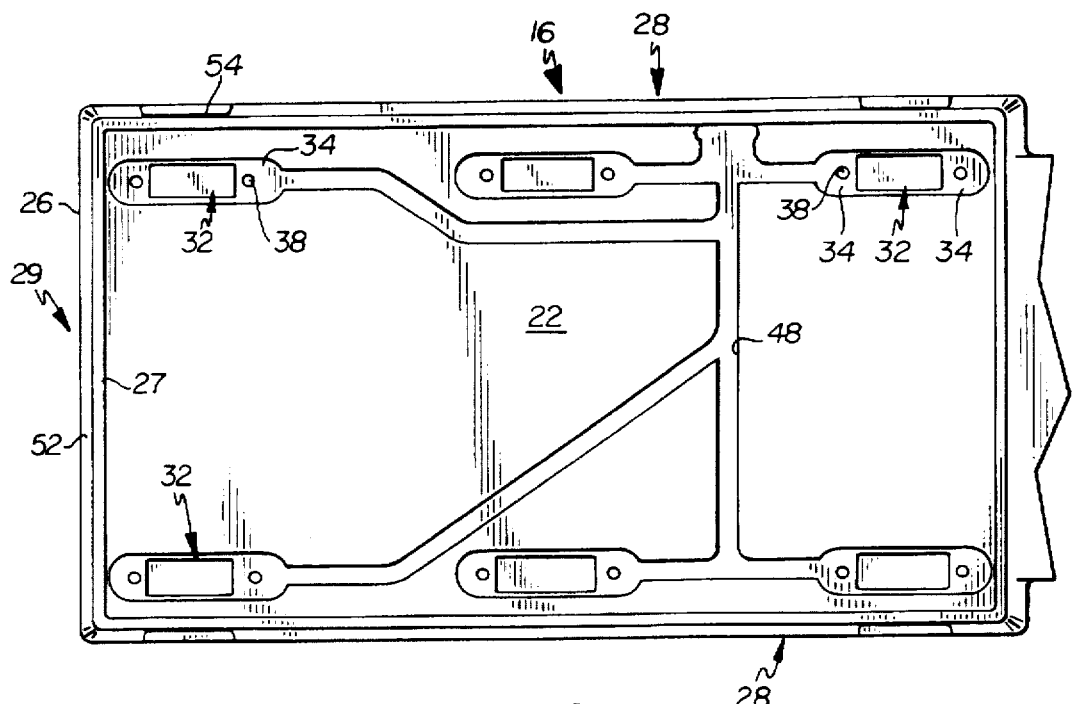
FIG. 6 is a top view of an alternative base.
Figure 7:
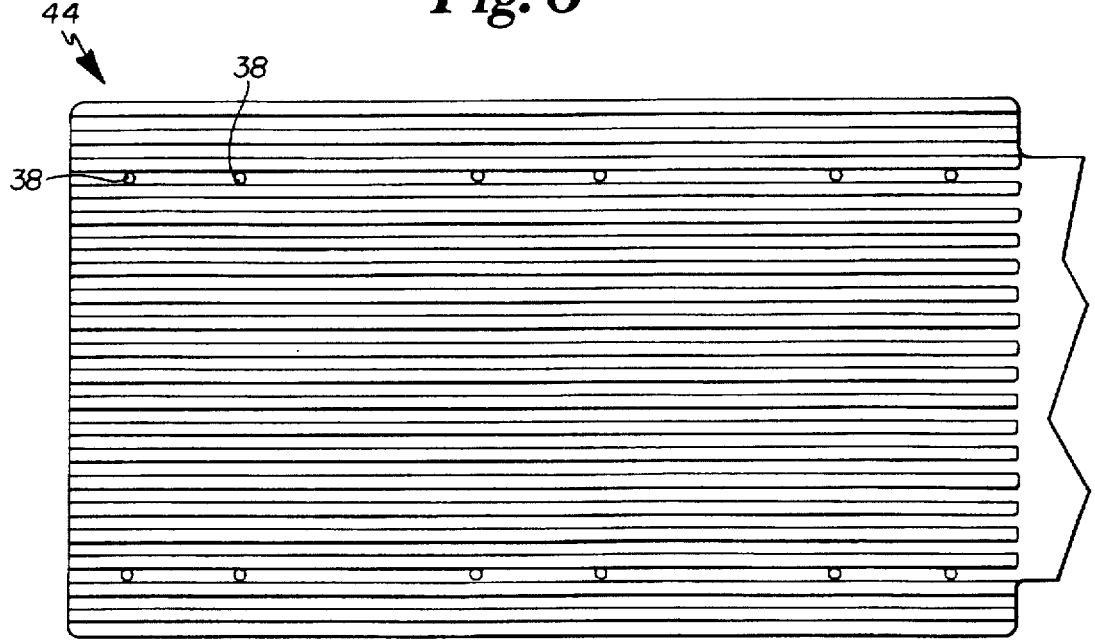
FIG. 7 is a bottom view of the base.

Referring to FIGS. 4–6, the platform 18 is disposed in a central, relatively shallow quadrilateral cavity 22 of the base 16 formed by a perimeter wall 26. The base has two sides 28 and two ends 29. In an operative condition, the lip 24 of the platform 1 8 is disposed just above the top surface 27 of the perimeter wall 26 of the base 16 without touching the wall 26. The platform 18 and base 16 configuration helps provide the low profile and associated accuracy and durability benefits.

A plurality of load cells 30 is mounted to the base 16 at predetermined locations and orientations. In a preferred embodiment, four load cells 30 are disposed proximate each corner of the interior cavity 22 of the base 16 and two load cells 30 are disposed at the midpoint along each side 28 of the base 16. The load cells 30 are connected to the base 16 via load cell mounts 32. The mounts 32 are machined as recesses in the base 16, which is desirable to provide a uniformly flat surface for load cell function. The recesses are particularly important when the base 16 is composed of cast aluminum because of its rough finish. Each mount 32 is sized to receive a single load cell 30. Each recessed mount 32 includes two support positions 34 and a strain cavity 36 disposed between the support positions 34. Each support position 34 has a threaded mounting screw aperture 38 aligned with a mounting aperture 40 in each end of the load cell 30. Mounting screws 42 are screwed from the bottom 44 of the base 16 through the mounting screw aperture 38 into the mounting aperture 40 in the load cell 30. The load cells 30 engage and vertically support the platform 18 via engagement members 46 described in detail below. Other load cell mount configurations are anticipated. However, the present load cell mount configuration is preferable for the type of load cells being used in this invention.

The base 16 has recessed wireways 48 that connect each recessed load cell mount 32, thereby forming a generally branched configuration. Electrical cables 50 are routed from each load cell 30 through these wireways 48 to the display 14. The base 16 has perimeter walls 26 that have a tapered portion 52 and a top surface 27 such that the bottom of the walls 26 are thicker than the top. The tapered portion 52, in conjunction with the general low profile of the scale 10, aids ongress and egress of vehicle wheels onto the scale 10. There are four groups of three threaded securing screw apertures 54 located in the tapered portion 52 of the perimeter wall 26. Two groups are located on each side 28 of the base 16. These screw apertures 54 receive securing screws 68 that secure the platform 18 to the base 16.

Figure 8:
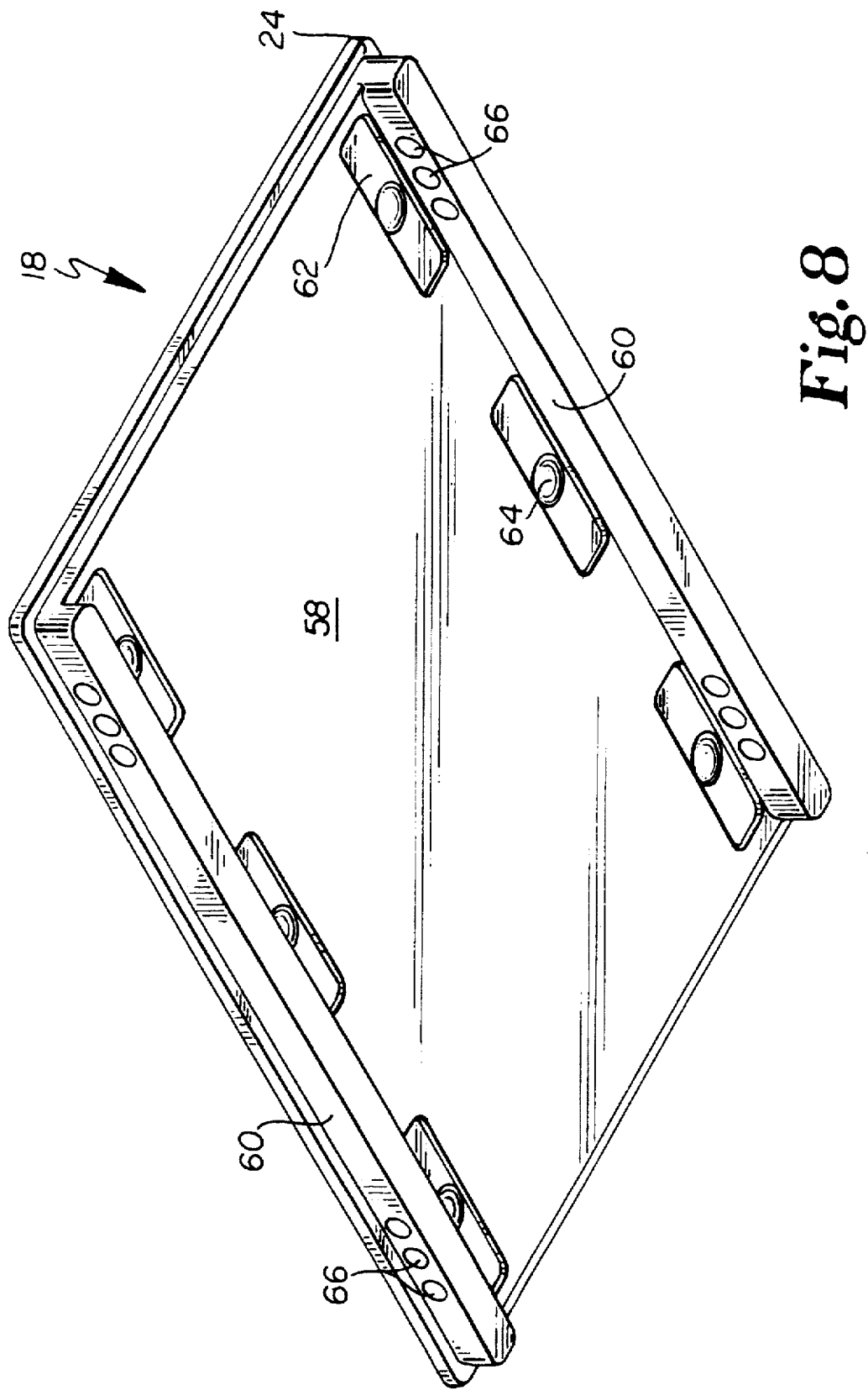
FIG. 8 is a perspective view of the bottom of the platform.
Figure 9:
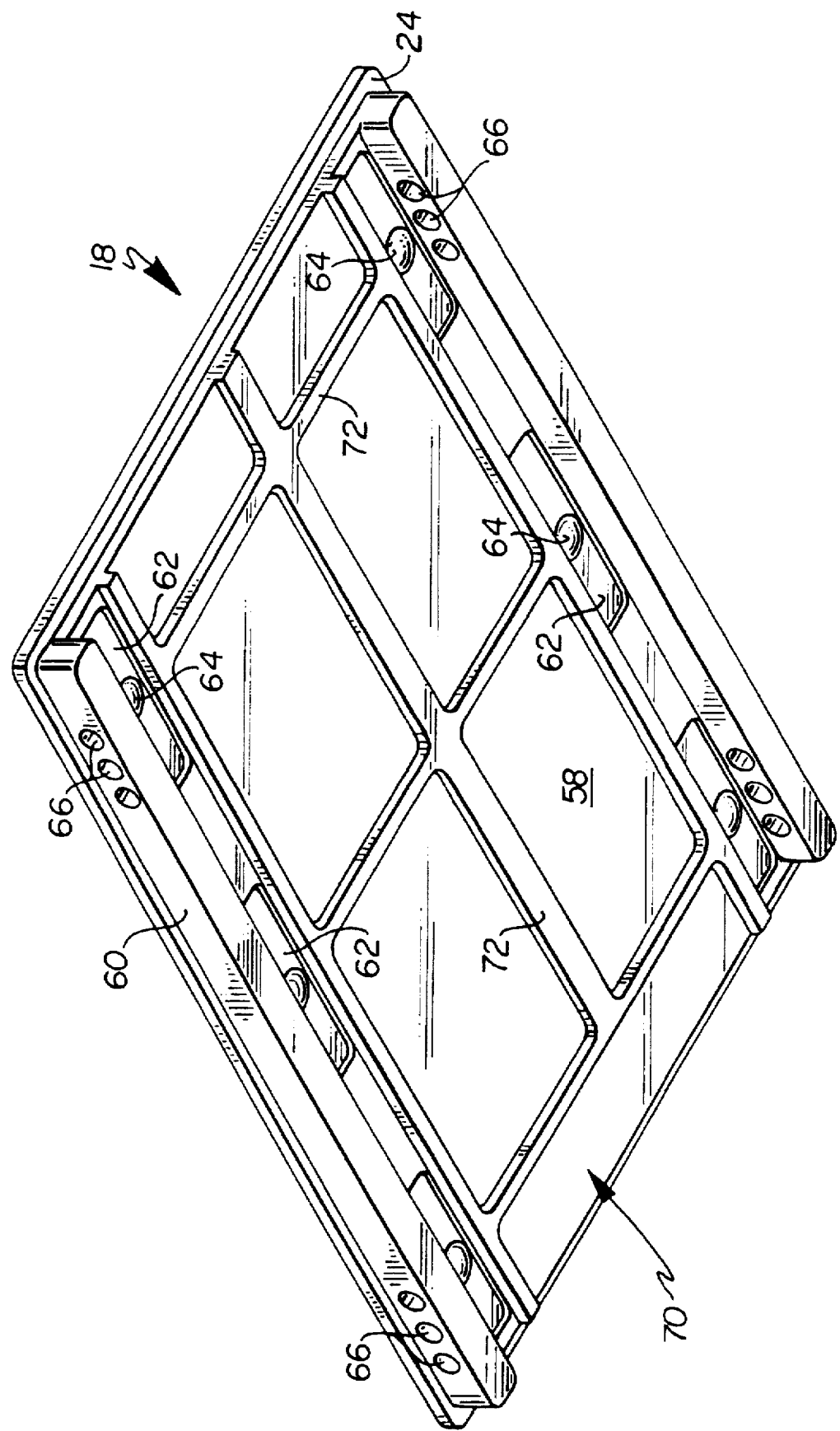
FIG. 9 is a perspective view of the bottom of an alternative platform.

Referring to FIGS. 4, and 8–9, the platform 18 is generally in the form of a flat, quadrilateral plate. The platform 18 has a bottom surface 58 and a top surface 20 of a size and shape to receive the object to be weighed. A non-slip surface 56 is preferably adhered to the top surface 20. The bottom surface 58 has a lip 24 about its perimeter configured to correspond with the top surface 27 of the perimeter wall 26 of the base 16. Two side walls 60 are attached to the bottom surface 56 against the inside edge of the lip 24. The side walls 60 are configured and arranged to fit within the cavity 22 of the base 16. This platform 18 structure provides the capacity for handling heavy loads and for maintaining a low profile. Each side wall 60 has two groups of three openings 66 positioned and arranged to be aligned with the securing screw apertures 54 located in the perimeter wall 26 of the base 16. Securing screws 68 are threaded through the apertures 54 and into the openings 66. The openings 66 are related to the screws 68 in such a manner as to secure the platform 18 to the base 16 while permitting the platform 18 to have a predetermined amount of motion within the cavity 22 of the base 16. This predetermined motion is desirable to maintain scale accuracy and to withstand lateral forces associated with braking and skidding tires. This predetermined motion is limited by the arrangement of the side walls 60 with respect to the perimeter wall 26.

The bottom surface 58 of the platform 18 has six load cell recesses 62 positioned to be aligned with and above the load cells 30. Each load cell recess 62 has a concave engagement surface 64 for moveable contact with the engagement member 46. As shown in FIG. 11, the load cell recess 62, engagement surface 64 and engagement member 46 are designed to create a gap between the platform 18 and the load cell 30. This gap ensures that the normal force of the load force is effectively transferred from the platform to the load cell.

An alternative platform embodiment is shown in FIG. 9. The bottom surface 58 of the platform 18 has a beam matrix 70 comprised of a pattern of webs 72. The beam matrix 70 provides additional strength to the platform 18 and allows the scale to be used with heavier loads.

Referring also to FIGS. 4 and 10–12, engagement members 46 in the preferred embodiment are load bearings 74. The load bearings 74 fit within a cupped surface 76 located in a predetermined position on the top of each load cell 30. The cupped surface 76 has a predetermined size and configuration to permit the load bearing 74 to move within the cupped surface 76. The load bearing 74 is in simultaneous contact with the concave engagement surface 64 of the platform 18. The elements of the base 16, load cells 30, engagement members 46, and platform 18 are designed with a small gap between the lip 24 of the platform 18 and the perimeter walls 26 of the base 16 so that the platform 18 rests entirely on the engagement members 46, which is in effective contact with the top of the load cells 30. Because of this design, the force of any load applied to the platform is accurately transferred through the engagement members 46 as an effective normal force to the load cells 30, whereas other scale designs may transfer part of the force through other members of the scale and thus reduce the effective normal force applied to the top of the load cell 30. Therefore, the cooperative design of the platform 18, engagement members 46, load cells 30, and base 16 allow the scale 10 of the present invention to accurately weigh heavy loads while preventing damage to the scale that may be caused by moving heavy vehicles on and off of it.

Referring to FIGS. 10–12, the load cell 30 is preferably a double ended shear beam type mechanism composed of 4340 chrome-molybdenum or the like for high strength and reliable deflection. Various types of load cells can be used so long as they have a low profile in accordance with the dimensions of the base and are capable of reliable and reproducible results. Intercomp Company manufactures load cells of this type. The load cell 30 has an elongated, generally square crosssectional configuration. A threaded mounting aperture 40 is located proximate each end of the load cell 30. The apertures 40 permit the load cell 30 to be mounted to the support positions of the base 16 by screwing the mounting screws 42 through the securing screw apertures 54 of the base 16 into the mounting apertures 40 of the load cell 30. In an operative orientation, the secured load cell 30 is supported from the bottom, proximate each end by the support positions 34. The center middle portion of the load cell 30 is located above the deflection or strain cavity 36. The engagement member 46 is centered in the top of the load cell 30 above the strain cavity 36. This configuration secures the load cell 30 in place, but also allows it to undergo shear deformation for proper function. A cable aperture 77 is disposed in one end of the load cell 30 to receive an electrical cable 50. The cable 50 provides electrical communication between the load cell 30 and the display 14. Each end of the load cell 30 has gauging recesses 78 located in opposing vertical side walls. Strain gauges (not shown) are disposed in the gauging recesses 78 to measure dimensional changes in the load cell 30 caused by the load, and the remainder of each gauging recess 78 is preferably filled with urethane to seal the load cell. Each strain gauge is electrically connected through channels 80. A longitudinally oriented stress isolation area 82 is formed between the gauging recesses 78. The stress isolation area 82 has side walls to provide localized stress measurement areas in the structure of the load cell 30. Strain gauges are oriented on opposing sides of the stress isolation area 82. These strain gauges are typically instrumental devices used to measure dimensional changes within or on the surface of a specimen, such as a load cell or more particularly the stress isolation area. The operation of a strain gauge is based on the principle that the electrical resistance of an conductor changes when it is subjected to a mechanical deformation. There are a number of resistance strain gauge types which may be used, including bonded strain gauge, wire gauge, foil gauge and semiconductor gauge. As each strain gauge is mechanically deformed, its length and diameter are altered, resulting in a change in its electrical resistance. This resistance change is measured in accordance with Poisson's Ratio to yield a weight value proportional to the load applied to the load cell 30. The top, center portion of the load cell 30 has the cupped surface 76 which is located at a predetermined position to apply the normal force from the load through the load bearing 74 and a central load bearing area of the load cell 30 to the stress isolation area 82. Each end of the load cell 30 is supported at the support positions 34 in the load cell mounts 32. The cooperation between these structural elements minimizes twisting forces and maximizes the normal or shear forces that are representative of the true load, thereby yielding highly accurate weight sensing by the strain gauges.

The proper orientation of the strain gauges on each mounted and aligned load cell permits accurate weighing irrespective of the exact location of the load relative to the top of the platform that may be due to uneven load placement or tilting of the scale. The design the of platform, engagement members, load cells, and base cooperate to permit the proper deflection of the load cell for accurate and repeatable readings without the potentially damaging side load effects and torquing.

Referring again to FIGS. 1–4, the display 14 includes a housing 84 which is preferably constructed of cast aluminum materials to provide EMI/RMI immunity for its internal circuitry. The display 14 includes a protective face plate and bezel, an LED or LCD display, and ON, OFF, ZERO and LB/KG conversion control switches 86, 87, 88 and 89. The housing 84 contains the electronic components and power source of the scale 10. The electronic components of the system are preferably disposed on a printed circuit board for spacial economy, durability, and ease of manufacture and repair. The circuit board is connected to the load cells via a series of electrical cables 50. The electronic components are powered by a battery pack. Batteries, such as six "AA" 1.2 volt Ni—Cd rechargeable batteries, are preferably welded together in series and secured by a plastic heat shrink tubing. Such a battery pack configuration provides easy removal and replacement of batteries without the use of tools, and also prevents battery corrosion from contaminating the remaining electrical components. This configuration further provides shielding from electrical interference during charging. The battery pack is insertable into the display 14 at a threaded battery port 90. The display 14 includes an external connector 92 that is designed for cable connection to communicate with additional scale assemblies and/or a central control unit, and to recharge the batteries without removing the battery pack.

A handle 94 is connected to the display. The handle 94 may be either connected using screws or may be integrally formed with the cast aluminum housing 84. The handle 94 is angled upwards to allow full hand access for lifting of the scale 10 without contacting the ground or other scale parts.

Although it is the mass of the aircraft that is sought to be determined by the scale, the load cells actually measure the force exerted on the scale by the effect of earth's gravitational field on the aircraft. However, the force applied by the earth's gravitational field is not constant, thus presenting an accuracy limitation in the determination of the mass of the aircraft. Latitude and altitude, buoyancy angle of the load all influence the accuracy of the scale and can be taken into account by the scale to provide more accurate readings by including global positioning system, temperature, pressure, and inclinometer sensors. Alternatively, these values can be entered manually into a discrete central processing unit. These limitations and solutions are described in detail in U.S. Pat. No. 5,646,376, which is incorporated by reference herein.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

The invention claimed is:

1. A weighing scale, comprising:
    (a) a base having a predetermined number of load cell mounts, each one of said load cell mounts having a strain cavity, said strain cavity providing a deflection gap between said load cell and said base;
    (b) a platform for contact with a load, said platform being disposed above and secured to said base;
    (c) a number of load cells equal to the number of load cell mounts, each one of said load cells being attached to one of said load cell mounts of said base and being positioned between said base and said platform; and
    (d) a number of engagement members equal to the number of said load cells, each one of said engagement members being in operational contact with said platform and one of said load cells.

2. The scale of claim 1, wherein each one of said load cell mounts has at least one support position upon which one of said load cells is attached.

3. The scale of claim 1, wherein each one of said load cell mounts is recessed.

4. The scale of claim 1, said base further including a perimeter wall of a predetermined height, wherein said perimeter wall defines a cavity in said base, said load cells being disposed within said cavity.

5. The scale of claim 4, wherein said perimeter wall has a tapered exterior side, a vertical interior side, a top and a bottom, said top being narrower than said bottom.

6. The scale of claim 4, wherein said platform has a bottom surface, said bottom surface having a plurality of side walls of a predetermined height, each of said side walls having a predetermined arrangement with respect to said perimeter wall.

7. The scale of claim 6, wherein said base has a plurality of threaded securing screw apertures for reception of a plurality of securing screws and said side walls of said platform has a plurality of openings aligned with said securing screw apertures, said openings being sized for receiving said securing screws in a moveable relationship that operationally secures said platform to said base, the moveable relationship between said platform and said base being limited by the predetermined relationship of said side walls to said perimeter wall.

8. The scale of claim 1, wherein said platform has a bottom surface, said bottom surface having a plurality of engagement surfaces equal to the number of engagement members, each one of said engagement surfaces being in operational contact with one of said engagement members.

9. The scale of claim 8, wherein said platform further has a number of load cell recesses equal to the number of said load cells, and wherein each one of said load cell recesses contains one of said engagement surfaces, said load cell recesses being sized to form a gap between said platform and said load cells.

10. The scale of claim 1, wherein said platform has a bottom surface, said bottom surface having a beam matrix comprised of webs.

11. The scale of claim 1, wherein said platform has a non-skid top surface.

12. The scale of claim 1, wherein said engagement member is a load bearing.

13. The scale of claim 12, wherein each one of said load cells has a cupped surface for operationally receiving said load bearing, said platform having a plurality of concave engagement surfaces equal to the number of engagement members, each one of said engagement members operationally contacting said load bearing.

14. The scale of claim 1, further comprising an electrical display and a power supply, said electrical display being affixed to said base, said power supply being located in said electrical display.

15. The scale of claim 14, wherein said electrical display is a digital display.

16. The scale of claim 14, wherein said electrical display has a battery compartment and said power supply is a battery located in said battery compartment, said electrical display further having a communication socket for communicating with a processor, said electrical display having controls.

17. The scale of claim 14, further comprising a handle attached to said electrical display.

18. A low profile, electronic weighing scale, comprising:
    (a) a base having a predetermined number of recessed load cell mounts in a predetermined arrangement, each one of said load cell mounts having two support positions and a strain cavity positioned between said two support positions, said strain cavity providing a deflection gap between said load cell and said base, said base further having a perimeter wall of a predetermined height, said perimeter wall defining a cavity in said base;
    (b) a platform for contact with a load, said platform being disposed above and secured to said base, said platform having a bottom surface and a plurality of side walls of a predetermined height on said bottom surface, each of said side walls having a predetermined arrangement with respect to said perimeter wall, said bottom surface further having a number of load cell recesses equal to the number of load cell mounts, each one of said load cell recesses containing a concave engagement surface;
    (c) a number of load cells equal to the number of load cell mounts, each one of said load cells being attached to said support position of one of said load cell mounts of said base, each one of said load cells having a cupped surface;
    (d) a number of load bearings equal to the number of said load cells, each one of said load bearings being in operational contact with said engagement surface of said platform and said cupped surface of one of said load cells; and (e) an electrical display affixed to said base, said electrical display having controls and a power supply.

19. A low profile, electronic weighing scale used to weigh and balance aircraft as well as other vehicles, comprising:

(a) a base having six recessed load cell mounts in a predetermined arrangement, each load cell mount having two support positions and a strain cavity positioned between said two support positions, said strain cavity providing a deflection gap between said load cell and said base, said base further having recessed wireways connecting each load cell mount, and having a perimeter wall of a predetermined height, said perimeter wall defining a cavity in said base, said perimeter wall having a tapered exterior side, a vertical interior side, a top and a bottom, said top being narrower than said bottom, said perimeter wall further having a plurality of threaded securing screw apertures for reception of a plurality of securing screws;

(b) a platform for contact with a load, said platform being disposed above and secured to said base, said platform having a non-skid top surface, a bottom surface, and two side walls of a predetermined height on said bottom surface, each of said side walls fitting next to said perimeter wall and within said cavity, said side walls further having a plurality of openings aligned with said securing screw apertures, said openings being sized for receiving and securing screws in a moveable relationship that operationally secures said platform to said base, said bottom surface further having six load cell recesses aligned above said load cell mounts, each one of said load cell recesses containing a concave engagement surface;

(c) six load cells, each one of said load cells being attached to said two support positions of one of said six load cell mounts of said base, each one of said load cells having a cupped surface;

(d) six engagement members, each one of said engagement members being in operational contact with said engagement surface of said platform and said cupped surface of one of said load cells, said engagement member being a load bearing;

(e) an electrical display affixed to said base, said electrical display having controls and a power supply; and (f) a handle attached to said electrical display.

20. A portable, high-capacity, low profile weighing scale, comprising:

(a) a base having a predetermined number of load cell mounts;

(b) a platform for contact with a load, said platform being disposed above and secured to said base, said platform having a plurality of concave engagement surfaces equal to the number of load cell mounts;

(c) a number of double ended shear beam load cells equal to the number of load cell mounts, each one of said load cells having a generally thin, centered stress isolation area formed between gauging recesses, said stress isolation area having a first side and an opposing second side, at least one strain gauge being attached to both said first side and said second side, each one of said load cells being attached to one of said load cell mounts of said base and being positioned between said base and said platform, each one of said load cells having a top surface with a cupped surface positioned over said stress isolation area; and (d) a number of load bearings equal to the number of said load cells, each one of said load bearings being in operational contact with one of said concave engagement surfaces of said platforimn and with said cupped surface of one of said load cells.

* * * * *